US011765561B2

(12) United States Patent
Tiwari et al.

(10) Patent No.: US 11,765,561 B2
(45) Date of Patent: Sep. 19, 2023

(54) METHODS AND SYSTEMS FOR PROVIDING WIRELESS CONNECTIVITY IN EXCHANGE FOR WARRANTY COMPLIANCE MONITORING USING ROAMING ANCHOR VEHICLES

(71) Applicant: Toyota Motor Engineering & Manufacturing North America, Inc., Plano, TX (US)

(72) Inventors: Prashant Tiwari, Santa Clara, CA (US); BaekGyu Kim, Mountain View, CA (US); Nejib Ammar, San Jose, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 252 days.

(21) Appl. No.: 17/193,687

(22) Filed: Mar. 5, 2021

(65) Prior Publication Data
US 2022/0286828 A1 Sep. 8, 2022

(51) Int. Cl.
*H04W 4/46* (2018.01)
*G07C 5/08* (2006.01)
*H04W 4/44* (2018.01)
*H04W 84/00* (2009.01)

(52) U.S. Cl.
CPC ............ *H04W 4/46* (2018.02); *G07C 5/0808* (2013.01); *H04W 4/44* (2018.02); *H04W 84/005* (2013.01)

(58) Field of Classification Search
CPC ....... H04W 4/46; H04W 4/44; H04W 84/005; G07C 5/0808
See application file for complete search history.

(56) References Cited

U.S. PATENT DOCUMENTS

| 8,145,733 | B1* | 3/2012 | Cheng ................. H04L 61/2514 709/227 |
| 10,360,021 | B2 | 7/2019 | Pereira Cabral et al. |
| 11,006,264 | B1* | 5/2021 | Takla .................... H04W 28/22 |
| 11,409,513 | B2* | 8/2022 | John ............... G08G 1/096838 |
| 11,475,721 | B2* | 10/2022 | Liu ...................... H04L 12/4015 |
| 2010/0142447 | A1* | 6/2010 | Schlicht ................. H04W 4/20 370/328 |
| 2013/0059583 | A1* | 3/2013 | Van Phan ............ H04W 76/14 455/435.1 |

(Continued)

FOREIGN PATENT DOCUMENTS

| CN | 204066386 U | 12/2014 |
| CN | 103593879 B | 7/2016 |

(Continued)

*Primary Examiner* — Mounir Moutaouakil
(74) *Attorney, Agent, or Firm* — Dinsmore & Shohl LLP

(57) ABSTRACT

An anchor vehicle includes a network device configured to access a network using dedicated wireless connectivity, and a processor. The processor is programmed to: receive a request for accessing the network using the dedicated wireless connectivity from a connected vehicle; determine whether the connected vehicle has consented to monitoring compliance with a warranty of the connected vehicle; and provide, to the connected vehicle, access to the dedicated wireless connectivity via the anchor vehicle in response to determining that the connected vehicle has consented to monitoring the compliance with the warranty of the connected vehicle.

20 Claims, 9 Drawing Sheets

(56) References Cited

U.S. PATENT DOCUMENTS

| | | |
|---|---|---|
| 2018/0052681 A1* | 2/2018 | Pereira Cabral .......... G06F 8/65 |
| 2019/0205115 A1 | 7/2019 | Gomes |
| 2020/0202645 A1* | 6/2020 | Gintz ................... G07C 5/0825 |
| 2020/0219335 A1* | 7/2020 | Gintz ................... G07C 5/0841 |
| 2021/0035378 A1* | 2/2021 | Lekutai ................ H04W 4/024 |
| 2021/0224056 A1* | 7/2021 | John ................ G08G 1/096838 |
| 2021/0300189 A1* | 9/2021 | Treadway ............... H04W 4/46 |
| 2021/0350637 A1* | 11/2021 | Estrada ................ G07C 5/0858 |
| 2023/0007458 A1* | 1/2023 | Perras ..................... H04W 4/40 |

FOREIGN PATENT DOCUMENTS

| | | | |
|---|---|---|---|
| CN | 105931100 A | 9/2016 | |
| CN | 105913572 B | 7/2018 | |
| WO | WO-2010028278 A2 * | 3/2010 | ............. H04W 4/20 |

\* cited by examiner

| 104 Vehicle | | 106 Vehicle | | 108 Vehicle | |
|---|---|---|---|---|---|
| Module | Consent | Module | Consent | Module | Consent |
| Engine | Yes | Engine | Yes | Engine | Yes |
| Brake | Yes | Brake | Yes | Brake | Yes |
| Tire Pressure | Yes | Tire Pressure | No | Tire Pressure | No |
| Battery | Yes | Battery | No | Battery | Yes |
| ACC | Yes | ACC | No | ACC | No |
| ADAS | Yes | ADAS | No | ADAS | Yes |

FIG. 8

METHODS AND SYSTEMS FOR PROVIDING WIRELESS CONNECTIVITY IN EXCHANGE FOR WARRANTY COMPLIANCE MONITORING USING ROAMING ANCHOR VEHICLES

TECHNICAL FIELD

The present disclosure relates to methods and systems for providing wireless connectivity in exchange for warranty compliance monitoring using roaming anchor vehicles.

BACKGROUND

Original Equipment Manufacturer (OEM) software is increasingly becoming complex and a lot of third party applications are added to vehicles after the vehicles are sold. Even after the third party applications are added to the vehicles, the OEM software may be still under warranty. Aftermarket non-approved software or hardware parts may adversely affect the operations of vehicles. It is expensive for OEMs to cover warranty for non-approved software or hardware. Currently many OEMs use private LTE networks to provide users with customized services and support. The customized services and supports are expensive as they are dependent on direct telecommunication network for each vehicle.

Accordingly, a need exists for assuring compliance with warranties, including software and hardware warranties, of vehicles in an efficient way.

SUMMARY

The present disclosure provides systems and methods for providing wireless connectivity in exchange for warranty compliance monitoring using roaming anchor vehicles.

In one embodiment, an anchor vehicle includes a network device configured to access a network using dedicated wireless connectivity, and a processor. The processor is programmed to: receive a request for accessing the network using the dedicated wireless connectivity from a connected vehicle; determine whether the connected vehicle has consented to monitoring compliance with a warranty of the connected vehicle; and provide, to the connected vehicle, access to the dedicated wireless connectivity via the anchor vehicle in response to determining that the connected vehicle has consented to monitoring the compliance with the warranty of the connected vehicle.

In another embodiment, a system includes an anchor vehicle and a server. The anchor vehicle is configured to: receive a request for accessing a network using dedicated wireless connectivity from a connected vehicle; determine whether the connected vehicle has consented to monitoring compliance with a warranty of the connected vehicle; and provide, to the connected vehicle, access to the dedicated wireless connectivity via the anchor vehicle in response to determining that the connected vehicle has consented to monitoring the compliance with the warranty of the connected vehicle. The server is configured to: obtain software or hardware diagnostic information about the connected vehicle; and analyze the compliance with the warranty of the connected vehicle based on the software or hardware diagnostic information about the connected vehicle.

In yet another embodiment, a method for providing wireless connectivity is provided. The method includes receiving, by an anchor vehicle, a request for accessing a network using dedicated wireless connectivity from a connected vehicle; determining, by the anchor vehicle, whether the connected vehicle has consented to monitoring compliance with a warranty of the connected vehicle; and providing, to the connected vehicle, access to the dedicated wireless connectivity via the anchor vehicle in response to determining that the connected vehicle has consented to monitoring the compliance with the warranty of the connected vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 8 depicts a table showing levels of consent by multiple vehicles, according to one or more embodiments shown and described herein.

DETAILED DESCRIPTION

The embodiments disclosed herein include assuring software and hardware of connected vehicles using roaming anchor vehicles that operate as open-roaming sub-servers and provide advanced wireless connectivity to the connected vehicles. By referring to FIGS. 1 and 2, a roaming anchor vehicle 102 is equipped with advanced wireless communication functions, e.g., advanced sensors, WiFi 6 connectivity technologies, and Hot Spot 2.0 technologies and connected vehicles 104, 106, 108 are not equipped with advanced sensors or WiFi 6/Hot Spot 2.0 connectivity technologies. The roaming anchor vehicle 102 serves as a dedicated sub-server to run open roaming service for dedicated connectivity to a server 160. The roaming anchor vehicle 102 may provide on-demand WiFi connectivity (e.g., mobility-as-a-service (MaaS)) to the connected vehicles 104, 106, 108 in return for the connected vehicles 104, 106, 108 giving consent to check compliance of warranty within the connected vehicles 104, 106, 108. That is, the connected vehicles 104, 106, 108 that request on-demand WiFi connectivity from the roaming anchor vehicle 102 need to consent to check compliance of warranty to access the on-demand WiFi connectivity. In embodiments, the warranty may include software warranty and hardware warranty are two examples. The warranty may include other warranties such as warranty requiring maintenance being completed, and the like.

The roaming anchor vehicle 102 and/or the server 160 may monitor and diagnose software and/or hardware of the connected vehicles 104, 106, 108 to determine compliance with the warranties of the connected vehicles 104, 106, 108 in response to the consents from the connected vehicles 104, 106, 108.

According to the present disclosure, the system induces connected vehicles to allow monitoring of their hardware and software by anchor roaming vehicles and/or a server. In this regard, the system efficiently assures hardware and software warranty of connected vehicles. In addition, in contrast with conventional monitoring systems that use private LTE networks requiring substantial resources and costs, the present system automates monitoring by inducing each of the connected vehicles to run assurance diagnoses. Further, the anchor roaming vehicle reports software and hardware defects of connected vehicles to the server only when the anchor roaming vehicle identifies the defects. Thus, the present system may reduce the communication load between anchor vehicles and the server.

Figure 1:
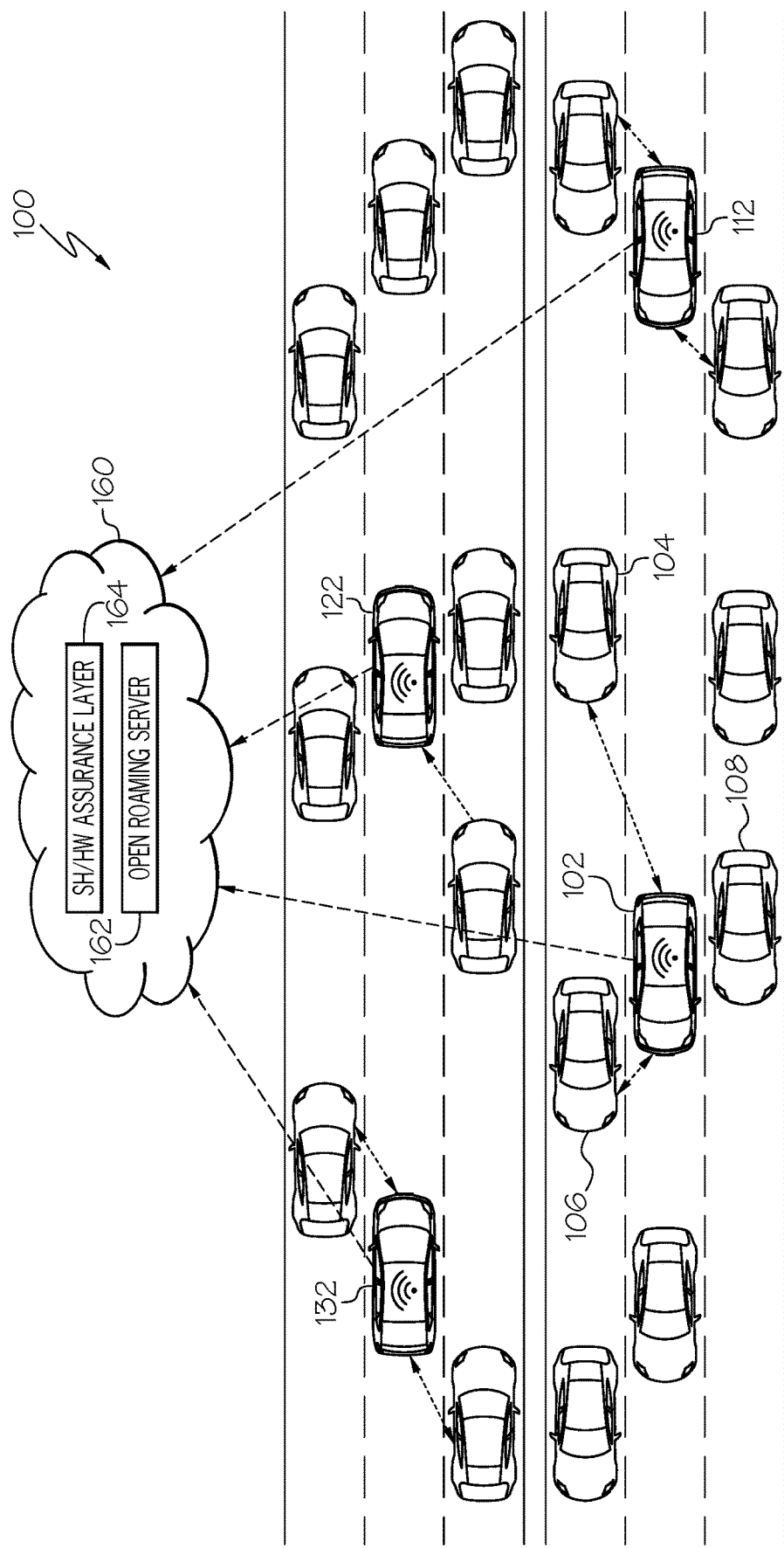
FIG. 1 schematically depicts a system for monitoring compliance with warranties of vehicles using roaming anchor vehicles that act as open-roaming sub-servers, according to one or more embodiments shown and described herein.

FIG. 1 schematically depicts a system for assuring software and hardware of vehicles using roaming anchor vehicles that act as open-roaming sub-servers, according to one or more embodiments shown and described herein.

In embodiments, the system 100 may include a plurality of roaming anchor vehicles 102, 112, 122, 132, connected vehicles including connected vehicles 104, 106, 108 that communicate with the roaming anchor vehicle 102, and a server 160. While FIG. 1 illustrates that four roaming anchor vehicles 102, 112, 122, 132, more than or less than four roaming anchor vehicles may be present in the region. While FIG. 1 illustrates three connected vehicles 104, 106, 108 communicate with the roaming anchor vehicle 102, more than or less than three connected vehicles may communicate with the roaming anchor vehicle 102. Each of the roaming anchor vehicles 102, 112, 122, 132 may communicate with connected vehicles within a certain distance of corresponding roaming anchor vehicle.

Each of the roaming anchor vehicles 102, 112, 122, 132 may communicate with the server 160. The server 160 may be a remote server such as a cloud server. In some embodiments, the server 160 may be a local server including, but not limited to, a roadside unit, an edge server, and the like. The server 160 may communicate with vehicles in an area covered by the server 160. The server 160 may communicate with other servers that cover different areas. The server 160 may communicate with a remote server and transmit information collected by the server 160 to the remote server.

The server 160 may include an open roaming server 162 and a software/hardware assurance layer 164. The open roaming server 162 may transmit a software-hardware monitoring module to connected vehicles that have consented to the monitoring compliance with a software/hardware warranty. The opening roaming server 162 may receive information about potential software/hardware defects of the connected vehicles and request the software/hardware assurance layer 164 to run detailed analysis on the potential software/hardware defects. The opening roaming server 162 may receive analysis from the software/hardware assurance layer 164 and inform the connected vehicles of maintenance guideline and a place to fix software/hardware and initiate an over-the-air update of software.

Each of the roaming anchor vehicles 102, 112, 122, 132 and connected vehicles 104, 106, 108 may be a vehicle including an automobile or any other passenger or non-passenger vehicle such as, for example, a terrestrial, aquatic, and/or airborne vehicle. In some embodiments, one or more of the roaming anchor vehicles 102, 112, 122, 132 and connected vehicles 104, 106, 108 may be an unmanned aerial vehicle (UAV), commonly known as a drone. In some embodiments, the roaming anchor vehicle 102 and the connected vehicles 104, 106, 108 may form a vehicle platoon. A vehicle platoon is a group of vehicles that can travel very closely together. Each vehicle communicates with other vehicles in the platoon. The roaming anchor vehicle 102 controls the speed and direction, and the connected vehicles 104, 106, 108 respond to the lead vehicle's movement.

In embodiments, each of the roaming anchor vehicles 102, 112, 122, 132 may be equipped with advanced wireless communication functions, e.g., advanced sensors and/or WiFi 6 connectivity technologies and connected vehicles 104, 106, 108 are not equipped with the advanced wireless communication functions. The roaming anchor vehicle 102 may communicate with the server 160 or other network at a higher speed and/or bandwidth compared to the connected vehicles 104, 106, 108. The roaming anchor vehicle 102 serves as a dedicated sub-server to run open roaming service for dedicated connectivity to a server 160. The roaming anchor vehicle 102 may provide on-demand wireless connectivity, e.g., WiFi connectivity, as mobility-as-a-service (MaaS) to the connected vehicles 104, 106, 108 in return for the connected vehicles 104, 106, 108 giving consent to check software and/or hardware warranty assurance within the connected vehicles 104, 106, 108. That is, the connected vehicles 104, 106, 108 that request on-demand WiFi connectivity from the roaming anchor vehicle 102 need to consent to check software and hardware warranty assurance to access the on-demand WiFi connectivity. If the connected vehicles 104, 106, 108 consent to the monitoring, the connected vehicles 104, 106, 108 may access the on-demand wireless connectivity via the roaming anchor vehicle 102.

The roaming anchor vehicle 102 and/or the server 160 may monitor and diagnose software and/or hardware of the connected vehicles 104, 106, 108 in response to the consents from the connected vehicles 104, 106, 108. For example, each of the connected vehicles 104, 106, 108 may download a monitoring module from the roaming anchor vehicle 102 or the server 160 and run software/hardware assurance diagnosis. Then, the connected vehicles 104, 106, 108 report the software/hardware diagnosis information to the roaming anchor vehicle 102 or the server 160.

Figure 2:
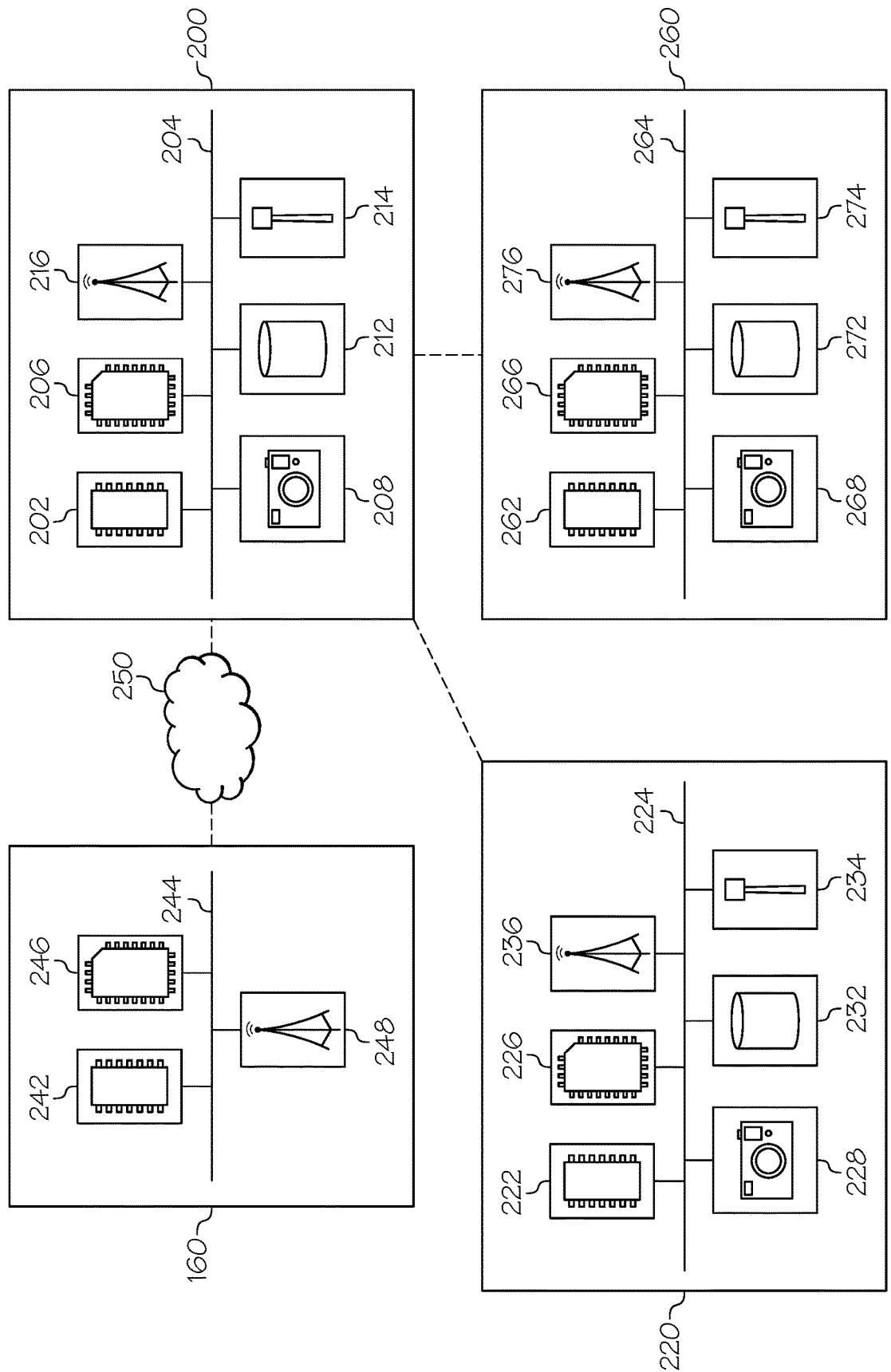
FIG. 2 depicts a schematic diagram for a system that includes a server, an anchor vehicle, and vehicles that are connected to the anchor vehicle, according to one or more embodiments shown and described herein.

FIG. 2 depicts a schematic diagram of a system for assuring software and hardware of vehicles using a roaming anchor vehicle that acts as open-roaming sub-servers, according to one or more embodiments shown and described herein. The system includes a roaming anchor vehicle system 200, connected vehicle systems 220 and 260, and the server 160.

It is noted that, while the roaming anchor vehicle system 200 and the connected vehicle systems 220 and 260 are depicted in isolation, each of the roaming anchor vehicle system 200 and the connected vehicle systems 220 and 260 may be included within a vehicle in some embodiments, for example, respectively within each of the roaming anchor vehicle 102 and the connected vehicles 104 and 106 of FIG. 1. In embodiments in which each of the roaming anchor vehicle system 200 and the connected vehicle systems 220 and 260 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The roaming anchor vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The roaming anchor vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the roaming anchor vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. In some embodiments, the one or more sensors 208 may also provide navigation support. That is, data captured by the one or more sensors 208 may be used to autonomously or semi-autonomously navigate the roaming anchor vehicle 102.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image. Ranging sensors like radar may be used to obtain a rough depth and speed information for the view of the roaming anchor vehicle system 200.

The roaming anchor vehicle system 200 comprises a satellite antenna 214 coupled to the communication path 204 such that the communication path 204 communicatively couples the satellite antenna 214 to other modules of the roaming anchor vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The roaming anchor vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the roaming anchor vehicle 102. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the roaming anchor vehicle system 200 comprises network interface hardware 216 for communicatively coupling the roaming anchor vehicle system 200 to the connected vehicle systems 220 and 260 and/or the server 160. The network interface hardware 216 may include advanced sensors and provide advanced wireless connectivity such as WiFi 6 connectivity technologies. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the roaming anchor vehicle system 200 may transmit its data to the connected vehicle systems 220 and 260 or the server 160. For example, the network interface hardware 216 of the roaming anchor vehicle system 200 may transmit captured images generated by the roaming anchor vehicle system 200, vehicle data, location data, and the like to the connected vehicle systems 220 and 260 or the server 160.

The roaming anchor vehicle system 200 may connect with one or more external vehicle systems (e.g., the connected vehicle systems 220 and 260) and/or external processing devices (e.g., the server 160) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the roaming anchor vehicle system 200 may be communicatively coupled to the server 160 by the network 250. In one embodiment, the network 250 may include one or more computer networks (e.g., a personal area network, a local area network, or a wide area network), cellular networks, satellite networks and/or a global positioning system and combinations thereof. Accordingly, the roaming anchor vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, wireless fidelity (WiFi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the server 160 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The communication path 244 may be similar to the communication path 204 in some embodiments.

Still referring to FIG. 2, the connected vehicle system 220 includes one or more processors 222, one or more memory modules 226, one or more sensors 228, one or more vehicle sensors 232, a satellite antenna 234, network interface hardware 236, and a communication path 224 communicatively connected to the other components of the connected vehicle system 220. The components of the connected vehicle system 220 may be structurally similar to and have similar functions as the corresponding components of the roaming anchor vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, and the communication path 224 corresponds to the communication path 204).

The network interface hardware 236 may be different from the network interface hardware 216. Particularly, the network interface hardware 236 may lack some advanced wireless connection functions that the network interface hardware 216 has. For example, the network interface hardware 216 may be equipped with advanced wireless communication functions, e.g., advanced sensors and/or WiFi 6 connectivity technologies, whereas the network interface hardware 236 may not be equipped with the advanced wireless communication functions.

Similarly, the connected vehicle system 260 includes one or more processors 262, one or more memory modules 266, one or more sensors 268, one or more vehicle sensors 272, a satellite antenna 274, network interface hardware 276, and a communication path 264 communicatively connected to the other components of the connected vehicle system 260. The components of the connected vehicle system 260 may be structurally similar to and have similar functions as the corresponding components of the roaming anchor vehicle system 200 (e.g., the one or more processors 262 corresponds to the one or more processors 202, the one or more memory modules 266 corresponds to the one or more memory modules 206, the one or more sensors 268 corresponds to the one or more sensors 208, the one or more vehicle sensors 272 corresponds to the one or more vehicle sensors 212, the satellite antenna 274 corresponds to the satellite antenna 214, and the communication path 264 corresponds to the communication path 204). The network interface hardware 276 may be different from the network interface hardware 216. Particularly, the network interface hardware 276 may lack some advanced wireless connection functions that the network interface hardware 216 has.

Figure 3:
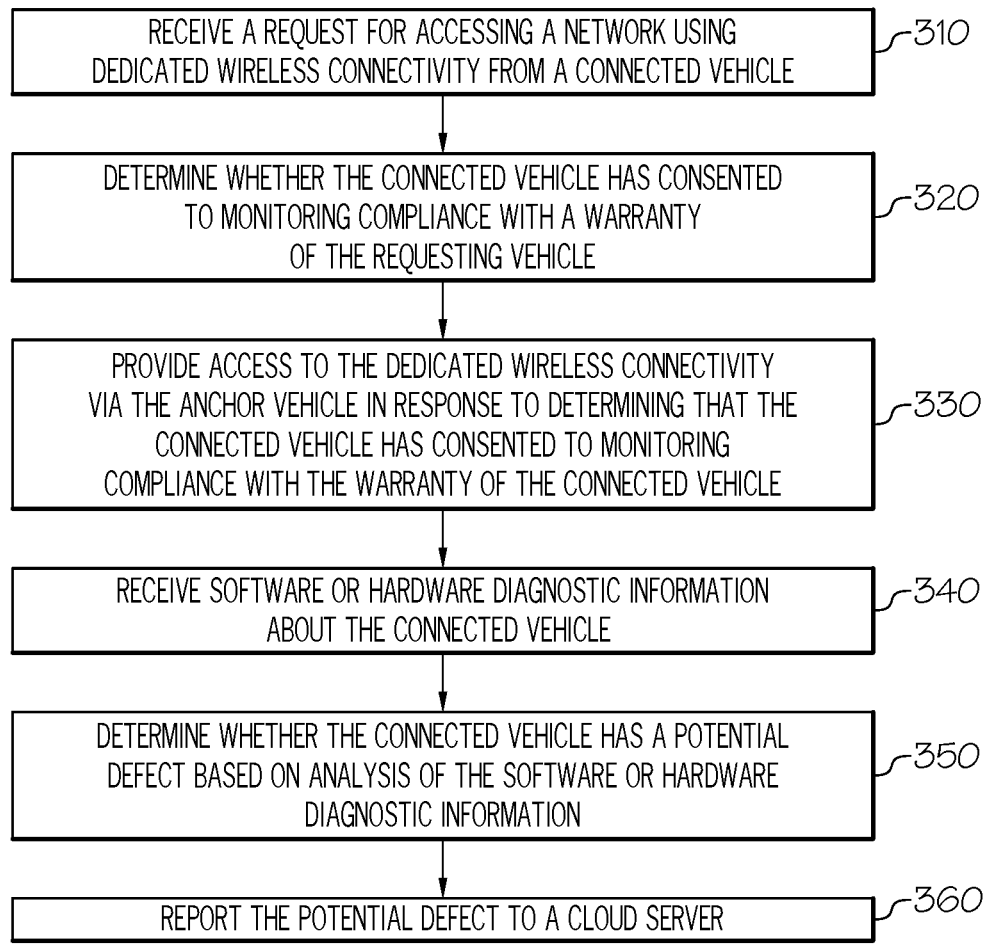
FIG. 3 depicts a flowchart for monitoring compliance with warranties of vehicles using a roaming anchor vehicle that provides wireless connectivity to the vehicles, according to one or more embodiments shown and described herein.

FIG. 3 depicts a flowchart for monitoring compliance of warranties of vehicles using a roaming anchor vehicle that provides wireless connectivity to the vehicles, according to one or more embodiments shown and described herein.

In step 310, a roaming anchor vehicle receives a request for accessing a network using dedicated wireless connectivity from a connected vehicle. In embodiments, by referring to FIGS. 1 and 2, the roaming anchor vehicle 102 may receive a request for accessing a network using advanced wireless connectivity, e.g., WiFi 6 connectivity, from one or more of the connected vehicles 104, 106, 108. The request may include a profile of each of the connected vehicles 104, 106, 108. The profile may include identification of the connected vehicle, information on network hardware interface of the connected vehicle, and information on whether the connected vehicle consented to monitoring a software warranty or a hardware warranty of the connected vehicle, and the like.

Referring back to FIG. 3, in step 320, the roaming anchor vehicle determines whether the connected vehicle has consented to monitoring compliance with a warranty of the connected vehicle. The warranty may be a software warranty, a hardware warranty or any other warranty for the connected vehicle. In embodiments, the roaming anchor vehicle 102 retrieves the profile of the connected vehicle and determines whether the connected vehicle has consented to monitoring compliance with a software warranty or a hardware warranty of the connected vehicle. For example, by referring to FIG. 1, the profile of the connected vehicle 104 indicates that the connected vehicle 104 has consented to monitoring compliance with the software warranty/hardware warranty of the connected vehicle 104, and the roaming anchor vehicle 102 determines that the connected vehicle 104 has consented to the monitoring based on the profile. In some embodiments, the roaming anchor vehicle 102 may ask the occupant of the connected vehicle 104 whether the occupant consents to monitoring compliance with a software warranty or a hardware warranty of the connected vehicle 104. For example, the screen of the connected vehicle 104 may display the question whether the occupant consents to monitoring compliance with the software warranty or hardware warranty, and the occupant may respond. If the occupant provides a consent, e.g., by selecting a consent button or providing a verbal consent to a virtual assistant, the connected vehicle 104 may transmit a consent message to the roaming anchor vehicle 102.

Referring back to FIG. 3, in step 330, the roaming anchor vehicle provides access to the dedicated wireless connectivity via the roaming anchor vehicle in response to determining that the connected vehicle has consented to monitoring compliance with the software or hardware warranty of the connected vehicle. In embodiments, by referring to FIG. 1, the roaming anchor vehicle 102 provides access to the advanced wireless connectivity to the connected vehicle 104 in response to determining that the connected vehicle 104 has consented to monitoring compliance with the software or hardware warranty of the connected vehicle 104. For example, the roaming anchor vehicle 102 may allow the connected vehicle 104 to use the dedicated communication link established between the roaming anchor vehicle 102 and the server 160 or other network. The communication link is established using advanced wireless connectivity such as WiFi 6 technology and Hot Spot 2.0 technology. Then, the connected vehicle 104 may communicate with the server 160 or other network via the dedicated communication link established between the roaming anchor vehicle 102 and the server 160 and the communication link between the connected vehicle 104 and the roaming anchor vehicle 102.

Referring back to FIG. 3, in step 340, the roaming anchor vehicle receives software or hardware diagnostic information about the connected vehicle. In embodiments, by referring to FIG. 1, the connected vehicle 104 may run the software/hardware monitoring module installed in the connected vehicle 104 to generate software/hardware diagnostic information. The monitoring module may monitor compliance with a warranty. For example, the monitoring module checks whether any unauthorized hardware or software is installed in the connected vehicle 104. As another example, the monitoring module checks whether hardware or software has any defects that do not comply with the warranty.

The software/hardware monitoring module may be already installed in the connected vehicle 104, or may be downloaded from the server 160 or from the roaming anchor vehicle 102. Then, the roaming anchor vehicle 102 receives software/hardware diagnostic information from the connected vehicle 104.

In some embodiments, the connected vehicle 104 may move out of a communication range of the roaming anchor vehicle 102 before the roaming anchor vehicle receives software or hardware diagnostic information about the connected vehicle 104. Thus, the roaming anchor vehicle 102 may determine whether the connected vehicle 104 moves out of the communication range of the roaming anchor vehicle 102 before the roaming anchor vehicle 102 receives software or hardware diagnostic information about the connected vehicle 104, and request the server 160 to obtain the software or hardware diagnostic information about the connected vehicle 104 if the connected vehicle 104 moves out of the communication range of the roaming anchor vehicle 102 before the roaming anchor vehicle 102 receives software or hardware diagnostic information about the connected vehicle 104. Accordingly, the software or hardware diagnostic information about the connected vehicle 104 may be obtained by either the server 160 or the roaming anchor vehicle 102.

Referring back to FIG. 3, in step 350, the roaming anchor vehicle determines whether the connected vehicle has a potential defect based on analysis of the software or hardware diagnostic information. In embodiments, by referring to FIG. 1, the roaming anchor vehicle 102 determines whether the connected vehicle 104 has a potential defect based on analysis of the software/hardware diagnostic information received from the connected vehicle 104.

Referring back to FIG. 3, in step 360, the roaming anchor vehicle reports the potential defect to a server. In embodiments, by referring to FIG. 1, the roaming anchor vehicle 102 reports potential defects of hardware or software of the connected vehicle 104 to the server 160.

Figure 4:
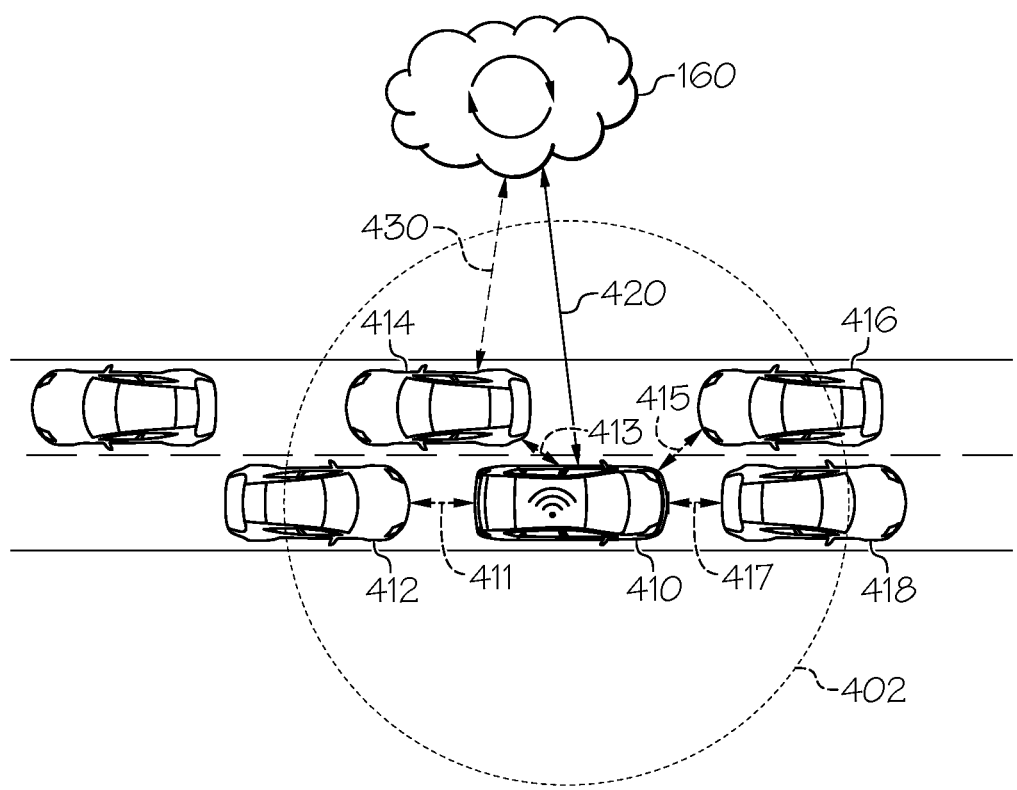
FIG. 4 depicts an anchor vehicle providing wireless connectivity to connected vehicles in a certain region, according to one or more embodiments shown and described herein.

FIG. 4 depicts an anchor vehicle providing wireless connectivity to connected vehicles in a certain region, according to one or more embodiments shown and described herein. The system 400 includes a roaming anchor vehicle 410, connected vehicles 412, 414, 416, 418, and the server 160. A dedicated communication link 420 is established between the roaming anchor vehicle 410 and the server 160. The dedicated communication link 420 provides advanced wireless connectivity, such as WiFi 6 technology, Hot Spot 2.0, and the like. The roaming anchor vehicle 410 may communicate with the connected vehicles 412, 414, 416, 418 via V2V communication links 411, 413, 415, 417, respectively.

In embodiments, the roaming anchor vehicle 410 receives a request for accessing the dedicated communication link 420 from the connected vehicle 412. The roaming anchor vehicle 410 determines that the connected vehicle 412 has consented to monitoring compliance with a software/hardware warranty of the connected vehicle 412 based on the profile of the connected vehicle 412 and provides access to the dedicated communication link 420. In response, the connected vehicle 412 may access the server 160 via the V2V communication link 411 and the dedicated communication link 420.

The roaming anchor vehicle 410 also receives a request for accessing the dedicated communication link 420 from the connected vehicle 414. The roaming anchor vehicle 410 determines that the connected vehicle 414 has not consented to monitoring compliance with a software/hardware warranty of the connected vehicle 414 based on the profile of the connected vehicle 414, and rejects providing access to the dedicated communication link 420. The connected vehicle 414 may not access to the server 160 or other network because the connected vehicle 414 does not have wireless connection accessibility. In some embodiments, the connected vehicle 414 may access the server 160 or other network using a communication link 430 established between the connected vehicle 414 and the server 160. In this case, the communication link 430 provides lower communication speed/bandwidth compared to the dedicated communication link 420. In this regard, the connected vehicle 414 is induced to consent to monitoring compliance with the software/hardware warranty to utilize the dedicated communication link 420.

Figure 5:
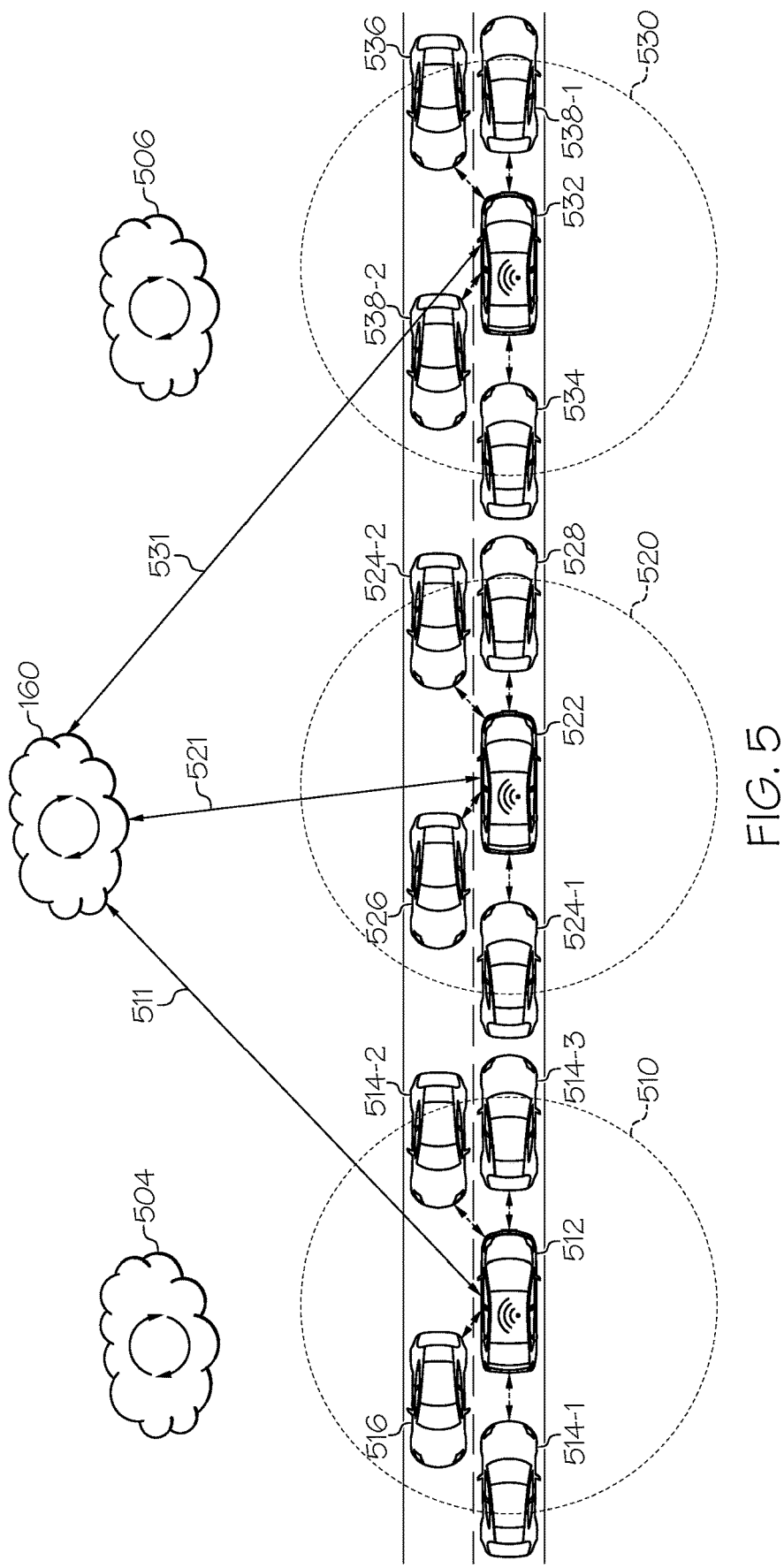
FIG. 5 depicts multiple anchor vehicles providing wireless connectivity to connected vehicles in different regions, according to one or more embodiments shown and described herein.

FIG. 5 depicts multiple anchor vehicles providing wireless connectivity to connected vehicles in different regions, according to one or more embodiments shown and described herein.

The system includes roaming anchor vehicles 512, 522, 532, servers 160, 504, 506, and a plurality of connected vehicles that communicate with the roaming anchor vehicles 512, 522, 532. Each of the roaming anchor vehicles 512, 522, 532 communicate with connected vehicles within a region. For example, the roaming anchor vehicle 512 communicates with connected vehicles 514-1, 514-2, 514-3, 516 within a region 510, the roaming anchor vehicle 522 communicates with connected vehicles 524-1, 524-2, 526, 528 within a region 520, and the roaming anchor vehicle 532 communicates with connected vehicles 534, 536, 538-1, 538-2 within a region 530. In embodiments, the server 160 is managed by an entity that manages the roaming anchor vehicle 512, but not the roaming anchor vehicles 522, 532. For example, the entity is a manufacturer of the roaming anchor vehicle 512 and manages the server 160. In this regard, the server 160 may periodically collect data from the roaming anchor vehicle 512, but not collect data from the roaming anchor vehicles 522 and 532. Instead, the server 504 is managed by a different entity that manages the roaming anchor vehicle 522, and the server 506 is managed by another entity that manages the roaming anchor vehicle 532.

A dedicated communication link 511 is established between the roaming anchor vehicle 512 and the server 160. Similarly, a dedicated communication link 521 is established between the roaming anchor vehicle 522 and the server 160 and a dedicated communication link 531 is established between the roaming anchor vehicle 532 and the server 160. Each of the dedicated communication link 511, 521, 531 provides advanced wireless connectivity, such as WiFi 6 technology, Hot Spot 2.0, and the like.

In embodiments, the roaming anchor vehicle 512 receives a request for accessing the communication link 511 from connected vehicle 514-1, 514-2, 514-3, 516. The connected vehicles 514-1, 514-2, 514-3 may be managed by the same entity that manages the server 160 and the roaming anchor vehicle 512. In this case, the roaming anchor vehicle 512 may already know whether the connected vehicles 514-1, 514-2, 514-3 have already consented to monitoring a software/hardware warranty of the connected vehicles 514-1, 514-2, 514-3 based on the profiles of the connected vehicles 514-1, 514-2, 514-3. The profiles of the connected vehicles 514-1, 514-2, 514-3 may be previously stored in the server 160 or may be downloaded from the server 160 to the roaming anchor vehicle 512. If the connected vehicles 514-1, 514-2, 514-3 have already consented, the roaming anchor vehicle 512 may allow the connected vehicles 514-1, 514-2, 514-3 to access the dedicated communication link 511 via the roaming anchor vehicle 512. In response, the connected vehicles 514-1, 514-2, 514-3 may access the server 160 via the communication link 511 and the V2V communication link between the roaming anchor vehicle 512 and each of the connected vehicles 514-1, 514-2, 514-3.

In contrast, the connected vehicle 516 is not managed by the entity that manages the server 160 and the roaming anchor vehicle 512. Thus, the roaming anchor vehicle 512 may not have information on whether the connected vehicle 516 consented to monitoring compliance with a software/hardware warranty of the connected vehicle 516 by the server 160. In this case, the roaming anchor vehicle 512 may transmit an inquiry message to the connected vehicle 516 whether the connected vehicle 516 consents to monitoring compliance with a software/hardware warranty of the connected vehicle 516 by the server 160.

The roaming anchor vehicle 522 may receive a request for accessing the dedicated communication link 521 from connected vehicles 524-1, 524-2. The connected vehicles 524-1, 524-2 may be managed by the same entity that manages the server 160, but the roaming anchor vehicle 522 is not managed by the same entity as the connected vehicles 524-1, 524-2. In this case, the access by the connected vehicles 524-1, 524-2 to the roaming anchor vehicle 522 may be regulated by a contractual service agreements that include provisions for connectivity policies and quality of service (QoS) and management of data security, privacy and anonymity. Similarly, the roaming anchor vehicle 532 may receive a request for accessing the dedicated communication link 531 from the connected vehicle 536. The connected vehicle 536 may be managed by the same entity that manages the server 160, but the roaming anchor vehicle 532 is not managed by the same entity as the connected vehicle 536. The access by the connected vehicle 536 to the roaming anchor vehicle 532 may be regulated by a contractual service agreements that include provisions for connectivity policies and QoS and management of data security, privacy and anonymity.

The system in FIG. 5 provides seamless and flexible connectivity to the server 160 by having access to a federated network of roaming anchor vehicles including the roaming anchor vehicle 512 that is managed by the server 160 and the roaming anchor vehicles 522, 532 that are not managed by the server 160.

Figure 6A:
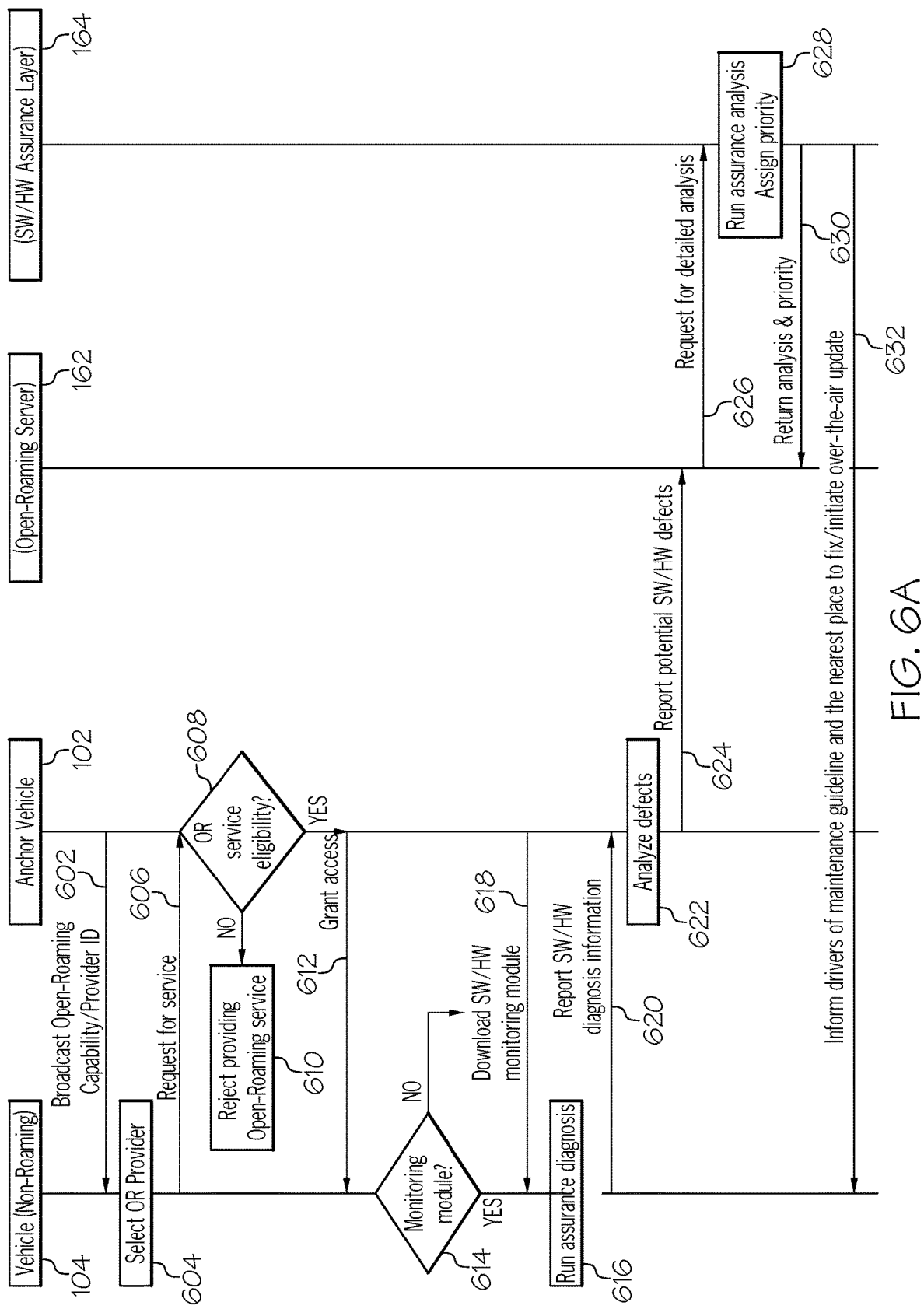
FIG. 6A depicts a flowchart illustrating operations among a non-roaming vehicle, an anchor vehicle, and a server, according to another embodiment shown and described herein.

FIG. 6A depicts a flowchart illustrating operations among a non-roaming vehicle, an anchor vehicle, and a server, according to another embodiment shown and described herein.

In step 602, the roaming anchor vehicle 102 broadcasts open-roaming capability/provider ID to non-roaming connected vehicles including the connected vehicle 104. For example, the roaming anchor vehicle 102 broadcasts available WiFi 6 connectivity or Hot Spot 2.0 along with a provider ID. In step 604, the connected vehicle 104 may select the open-roaming (OR) provider. Then, the connected vehicle 104 may transmit a request for the OR service to the roaming anchor vehicle 102 in step 606.

In step 608, the roaming anchor vehicle 102 determines whether the OR service is eligible for the connected vehicle 104. If the OR service is eligible for the connected vehicle 104, then the roaming anchor vehicle 102 grants access to the OR service to the connected vehicle 104 in step 612. If the OR service is not eligible for the connected vehicle 104, then the roaming anchor vehicle 102 rejects providing the OR service to the connected vehicle 104 in step 610. In embodiments, the roaming anchor vehicle 102 considers multiple factors in determining whether the OR service is eligible for the connected vehicle 104. For example, the roaming anchor vehicle 102 may check whether the connected vehicle 104 has consented to monitoring compliance with the software warranty or hardware warranty of the connected vehicle 104. The roaming anchor vehicle 102 may determine that the OR service is eligible for the connected vehicle 104 if it is determined that the connected vehicle 104 has consented to monitoring compliance with the software warranty or a hardware warranty of the connected vehicle 104. As another example, the roaming anchor vehicle 102 may check an OR service capacity limit. Specifically, the roaming anchor vehicle 102 determines a number of vehicles accessing advanced wireless connectivity (e.g., WiFi 6, Hot Spot 2.0) via the roaming anchor vehicle 102, and provides, to the connected vehicle 104, access to the advanced wireless connectivity via the roaming anchor vehicle 102 in response to determining that the number of vehicles accessing the advanced wireless connectivity via the roaming anchor vehicle 102 is less than a threshold number.

In step 614, the connected vehicle 104 may determine whether the connected vehicle 104 includes a module for monitoring software or hardware of the connected vehicle 104. The module may check whether the connected vehicle 104 has installed non-approved software or hardware elements that may affect vehicle operations. If it is determined that the connected vehicle 104 does not include the module for monitoring software or hardware, the connected vehicle 104 may download the module from the roaming anchor vehicle 102 in step 618. If it is determined that the connected vehicle 104 includes the module for monitoring software or hardware, the process proceeds to step 616.

In step 616, the connected vehicle 104 runs software/hardware assurance diagnosis, and reports software/hardware diagnosis information to the roaming anchor vehicle 102 in step 620. The software/hardware diagnosis information may be data including information about the software and/or hardware installed in the connected vehicle 104, for example, approval or certifications of the hardware/software, versions of the software, makers of the software/hardware, date of software/hardware installation, and the like.

In step 622, the roaming anchor vehicle 102 analyzes the software/hardware diagnosis information to identify potential software/hardware defects. Then, the roaming anchor vehicle 102 reports the potential software/hardware defects to the OR server 162 of the server 160 in step 624. In step 626, the OR server 162 transmits a request for detailed analysis to the software/hardware assurance layer 164. In response, in step 628, the software/hardware assurance layer 164 runs assurance analysis and assigned priority among the software/hardware that need to be fixed.

In step 630, the software/hardware assurance layer 164 returns analysis and priority on the software/hardware to the OR server 162. In step 632, the OR server 162 informs the driver of the connected vehicle 104 of maintenance guideline and the place to fix hardware/software or initiate over-the-air-update.

Figure 6B:
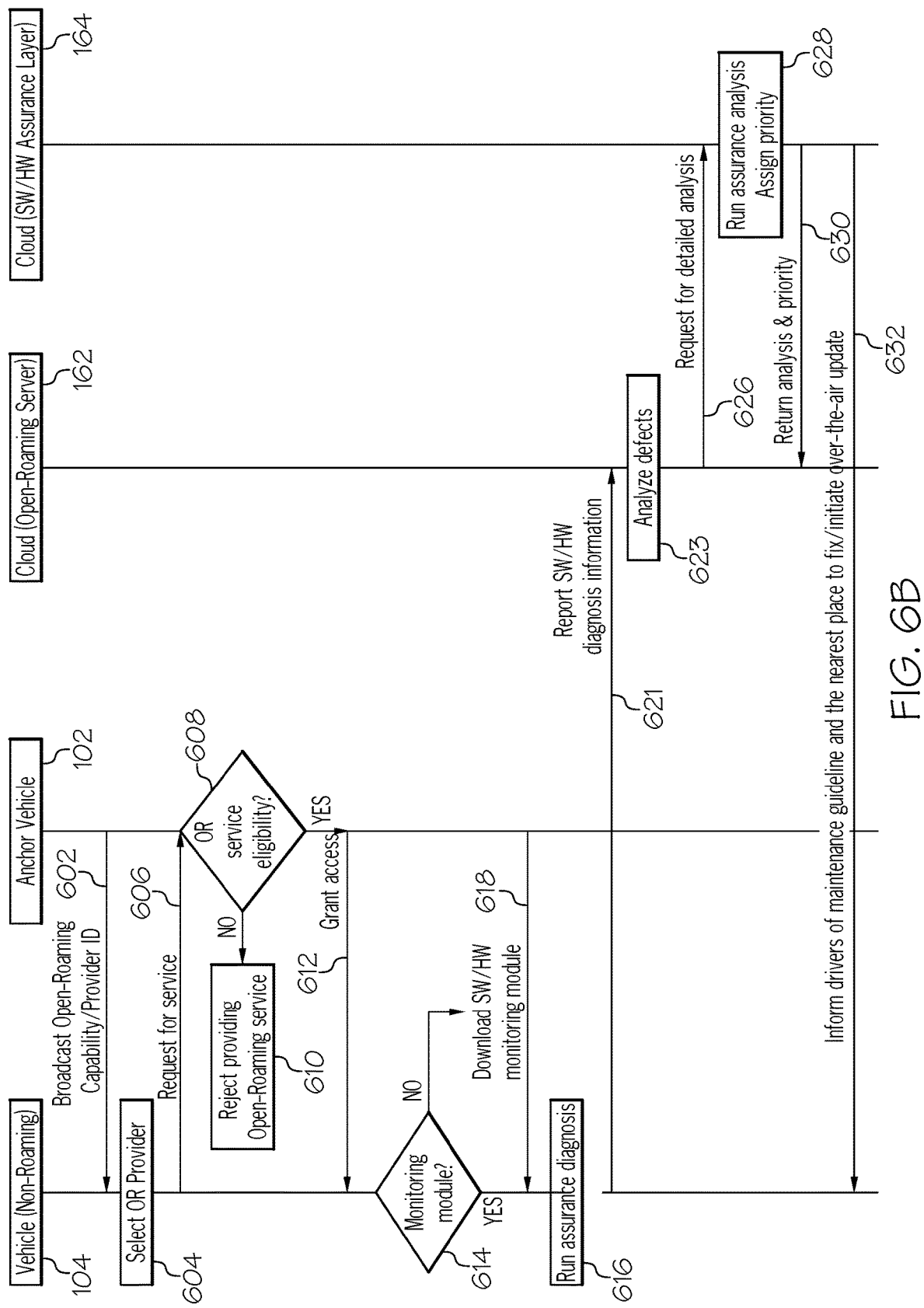
FIG. 6B depicts a flowchart illustrating operations among a non-roaming vehicle, an anchor vehicle, and a server, according to another embodiment shown and described herein.

FIG. 6B depicts a flowchart illustrating operations among a non-roaming vehicle, an anchor vehicle, and a server, according to another embodiment shown and described herein.

In FIG. 6B, the steps 604 through 618 are the same as the steps 604 through 618 in FIG. 6A. In this embodiment, in step 621, the connected vehicle 104 reports software/hardware diagnosis information to the OR server 162 instead of the roaming anchor vehicle 102. The software/hardware diagnosis information may be data including information about the software and/or hardware installed in the connected vehicle 104, for example, approval of the hardware/software, versions of the software, makers of the software/hardware, date of software/hardware installation, and the like. In step 623, the OR server 162 analyzes the software/hardware diagnosis information to identify potential software/hardware defects. Then, in step 626, the OR server 162 transmits a request for detailed analysis to the software/hardware assurance layer 164. Steps 628, 630, 632 in FIG. 6B are the same as the steps 628, 630, 632 in FIG. 6A.

Figure 7:
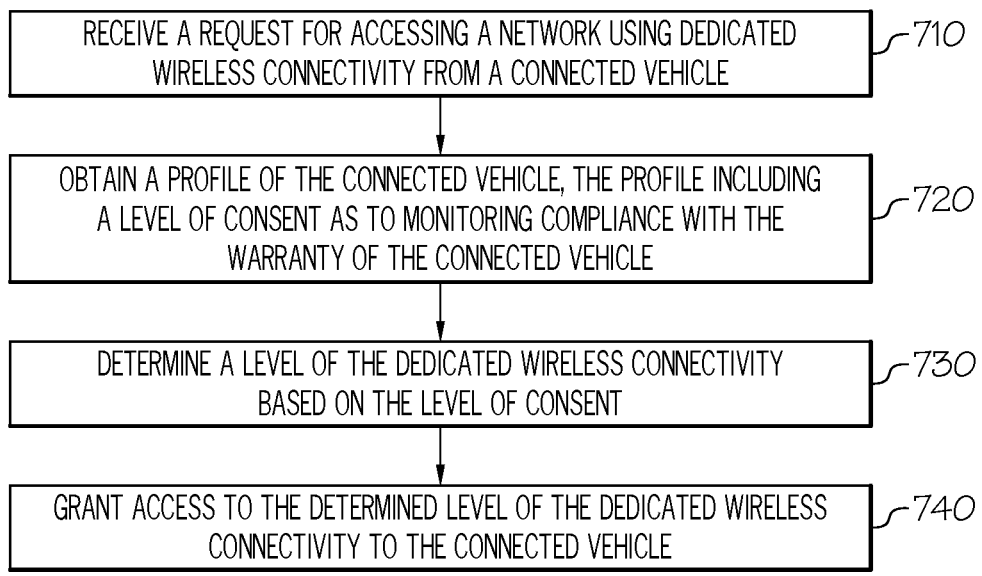
FIG. 7 depicts a flowchart for providing different levels of wireless connectivity to different connected vehicles, according to one or more embodiments shown and described herein.

FIG. 7 depicts a flowchart for providing different levels of wireless connectivity to different connected vehicles, according to one or more embodiments shown and described herein.

In step 710, a roaming anchor vehicle receives a request for accessing a network using dedicated wireless connectivity from a connected vehicle. In embodiments, by referring to FIG. 1, the roaming anchor vehicle 102 may receive a request for accessing a network using advanced wireless connectivity, e.g., WiFi 6 connectivity, from one or more of the connected vehicles 104, 106, 108.

Referring back to FIG. 7, in step 720, the roaming anchor vehicle obtains a profile of the connected vehicle. In embodiments, by referring to FIG. 1, the roaming anchor vehicle 102 may obtain the profiles of the connected vehicles 104, 106, 108 from the server 160. Alternatively, the roaming anchor vehicle 102 may obtain the profiles of the connected vehicles 104, 106, 108 from the connected vehicles 104, 106, 108 via V2V communication. The profile may include a level of consent as to monitoring compliance with the software warranty or the hardware warranty of the connected vehicle. For example, FIG. 8 illustrates a table including a level of consent for each of the connected vehicles 104, 106, 108. The connected vehicle 104 has consented to monitoring all elements including an engine, a brake, a tire pressure, a battery, adaptive cruise control, and an advanced driver-assistance system. The connected vehicle 106 has consented to monitoring an engine and a brake only. The connected vehicle 108 has consented to monitoring an engine, a brake, a battery, and an advanced driver-assistance system only.

Referring back to FIG. 7, in step 730, the roaming anchor vehicle determines a level of the dedicated wireless connectivity based on the level of consent. For example, by referring to the table in FIG. 8, the level of consent for the connected vehicle 104 is high, the level of consent for the connected vehicle 108 is middle, and the level of consent for the connected vehicle 106 is low. Then, the roaming anchor vehicle 102 may determine that the level of the wireless connectivity for the connected vehicle 104 is high. For example, the speed/bandwidth of the dedicated wireless connectivity for the connected vehicle 104 is greatest among the connected vehicles 104, 106, 108. Similarly, the roaming anchor vehicle 102 may determine that the level of the wireless connectivity for the connected vehicle 106 is low. For example, the speed/bandwidth of the dedicated wireless connectivity for the connected vehicle 106 is lowest among the connected vehicles 104, 106, 108.

Referring to FIG. 7, in step 740, the roaming anchor vehicle grants access to the determined level of the wireless connectivity to the connected vehicle. In embodiments, by referring to FIG. 1, the roaming anchor vehicle 102 provides access to the determined level of the wireless connectivity to the connected vehicle 104. For example, the roaming anchor vehicle 102 may allow the connected vehicle 104 to use the communication link established between the roaming anchor vehicle 102 and the server 160 or other network based on the determined level of wireless connectivity. The communication link is established using advanced wireless connectivity such as WiFi 6 technology and Hot Spot 2.0 technology. In this regard, as described above in step 730, the connected vehicle 104 may enjoy higher speed wireless connectivity than the connected vehicle 106 because of the high level of consent. Thus, connected vehicles are encouraged to consent to a high level of monitoring hardware/software of the connected vehicles in order to have better speed or quality wireless connectivity.

It should be understood that embodiments described herein are directed to vehicles and systems for assuring warranty compliance of connected vehicles. In embodiments, an anchor vehicle for assuring warranty compliance of connected vehicles is provided. The anchor vehicle includes a network device configured to access a network using dedicated wireless connectivity; a processor configured to: receive a request for accessing the network using the dedicated wireless connectivity from a connected vehicle; determine whether the connected vehicle has consented to monitoring compliance of a warranty of the connected vehicle; and provide, to the connected vehicle, access to the dedicated wireless connectivity via the anchor vehicle in response to determining that the connected vehicle has consented to monitoring compliance of the warranty of the connected vehicle.

According to the present disclosure, the system induces connected vehicles to allow monitoring of their hardware and software by anchor roaming vehicles and/or a server. In this regard, the system efficiently assures hardware and software warranty of connected vehicles. In addition, in contrast with conventional monitoring system that uses private LTE networks requiring substantial resources and costs, the present system automates monitoring by inducing each of connected vehicles to run assurance diagnosis. Further, the anchor roaming vehicle reports software and hardware defects of connected vehicles to the server only when the anchor roaming vehicle identifies the defects. Thus, the present system may reduce communication load between anchor vehicles and the server.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An anchor vehicle comprising:
   a network device configured to access a network using dedicated wireless connectivity; and
   a processor programmed to:
   receive a request for accessing the network using the dedicated wireless connectivity from a connected vehicle;
   determine whether the connected vehicle has consented to monitoring compliance with a warranty of the connected vehicle;
   provide, to the connected vehicle, access to the dedicated wireless connectivity via the anchor vehicle in response to determining that the connected vehicle has consented to monitoring the compliance with the warranty of the connected vehicle; and
   reject providing access to the dedicated wireless connectivity via the anchor vehicle in response to determining that the connected vehicle has not consented to monitoring the compliance with the warranty of the connected vehicle.

2. The anchor vehicle of claim 1, wherein the warranty is at least one of a software warranty or a hardware warranty.

3. The anchor vehicle of claim 1, wherein the processor is programmed to:
   receive software or hardware diagnostic information about the connected vehicle;
   determine whether the connected vehicle has a potential defect based on analysis of the software or hardware diagnostic information; and
   report the potential defect to a server.

4. The anchor vehicle of claim 1, wherein the processor is programmed to:
   obtain a profile of the connected vehicle, the profile including a level of consent as to monitoring the compliance with the warranty of the connected vehicle;
   determine a level of the dedicated wireless connectivity based on the level of consent; and
   grant access to the determined level of the dedicated wireless connectivity to the connected vehicle.

5. The anchor vehicle of claim 1, wherein the processor is programmed to:
   determine a number of vehicles accessing the dedicated wireless connectivity via the anchor vehicle; and provide, to the connected vehicle, access to the dedicated wireless connectivity via the anchor vehicle in response to determining that the connected vehicle has consented to monitoring the compliance with the warranty of the connected vehicle and determining that the number of vehicles accessing the dedicated wireless connectivity via the anchor vehicle is less than a threshold number.

6. The anchor vehicle of claim 1, wherein the processor is programmed to:
   broadcast information about the dedicated wireless connectivity; and
   receive the request for accessing the network using the dedicated wireless connectivity from the connected vehicle in response to broadcasting the information.

7. The anchor vehicle of claim 1, wherein the processor is programmed to:
   determine whether the connected vehicle moves out of a communication range of the anchor vehicle before the anchor vehicle receives software or hardware diagnostic information about the connected vehicle; and
   request a server to obtain the software or hardware diagnostic information about the connected vehicle in response to determining that the connected vehicle moves out of the communication range of the anchor vehicle before the anchor vehicle receives software or hardware diagnostic information about the connected vehicle.

8. The anchor vehicle of claim 1, wherein the processor is programmed to:
   communicate with the connected vehicle via vehicle-to-vehicle communication; and
   communicate with a server using the dedicated wireless connectivity.

9. The anchor vehicle of claim 1, wherein the processor is programmed to:
   instruct the connected vehicle to download or update a module for monitoring software or hardware of the connected vehicle.

10. A system comprising:
    an anchor vehicle configured to:
      receive a request for accessing a network using dedicated wireless connectivity from a connected vehicle;
      determine whether the connected vehicle has consented to monitoring compliance with a warranty of the connected vehicle;
      provide, to the connected vehicle, access to the dedicated wireless connectivity via the anchor vehicle in response to determining that the connected vehicle has consented to monitoring the compliance with the warranty of the connected vehicle; and
      reject providing access to the dedicated wireless connectivity via the anchor vehicle in response to determining that the connected vehicle has not consented to monitoring the compliance with the warranty of the connected vehicle; and
    a server configured to:
      obtain software or hardware diagnostic information about the connected vehicle; and
      analyze the compliance with the warranty of the connected vehicle based on the software or hardware diagnostic information about the connected vehicle.

11. The system of claim 10, wherein the server is configured to transmit a module for monitoring software or hardware to the connected vehicle in response to determining that the connected vehicle has consented to monitoring the compliance with the warranty of the connected vehicle.

12. The system of claim 10, wherein the server is configured to transmit to the connected vehicle a maintenance guidance of software or hardware of the connected vehicle based on the analysis of the compliance with the warranty of the connected vehicle.

13. The system of claim 10, wherein the anchor vehicle is configured to:
    receive software or hardware diagnostic information about the connected vehicle;
    determine whether the connected vehicle has a potential defect based on analysis of the software or hardware diagnostic information; and
    report the potential defect to the server.

14. The system of claim 10, wherein the anchor vehicle is configured to:
    obtain a profile of the connected vehicle, the profile including a level of consent as to monitoring the compliance with the warranty of the connected vehicle;
    determine a level of the dedicated wireless connectivity based on the level of consent; and
    grant access to the determined level of the dedicated wireless connectivity to the connected vehicle.

15. The system of claim 10, wherein the anchor vehicle is configured to:
    determine a number of vehicles accessing the dedicated wireless connectivity via the anchor vehicle; and
    provide, to the connected vehicle, access to the dedicated wireless connectivity via the anchor vehicle in response to determining that the connected vehicle has consented to monitoring the compliance with the warranty of the connected vehicle and determining that the number of vehicles accessing the dedicated wireless connectivity via the anchor vehicle is less than a threshold number.

16. The system of claim 10, wherein the anchor vehicle is configured to:
    broadcast information about the dedicated wireless connectivity; and
    receive the request for accessing the network using the dedicated wireless connectivity from the connected vehicle in response to broadcasting the information.

17. The system of claim 10, wherein the server is configured to:
    determine whether the connected vehicle moves out of a communication range of the anchor vehicle before the anchor vehicle or the server receives software or hardware diagnostic information about the connected vehicle; and
    request software or hardware diagnostic information about the connected vehicle directly from the connected vehicle in response to determining that the connected vehicle moves out of a communication range of the anchor vehicle before the anchor vehicle or the server receives software or hardware diagnostic information about the connected vehicle.

18. A method for providing wireless connectivity, the method comprising:
    receiving, by an anchor vehicle, a request for accessing a network using dedicated wireless connectivity from a connected vehicle;
    determining, by the anchor vehicle, whether the connected vehicle has consented to monitoring compliance with a warranty of the connected vehicle;
    providing, to the connected vehicle, access to the dedicated wireless connectivity via the anchor vehicle in response to determining that the connected vehicle has consented to monitoring the compliance with the warranty of the connected vehicle; and rejecting providing access to the dedicated wireless connectivity via the anchor vehicle in response to determining that the connected vehicle has not consented to monitoring the compliance with the warranty of the connected vehicle.

19. The method of claim 18, further comprising:

receiving software or hardware diagnostic information about the connected vehicle;

determining whether the connected vehicle has a potential defect based on analysis of the software or hardware diagnostic information; and reporting the potential defect to a server.

20. The method of claim 18, further comprising:

obtaining a profile of the connected vehicle, the profile including a level of consent as to monitoring the compliance with the warranty of the connected vehicle;

determining a level of the dedicated wireless connectivity based on the level of consent; and granting access to the determined level of the dedicated wireless connectivity to the connected vehicle.

* * * * *